(No Model.)
J. A. ELLIOTT.
STOVE PIPE COUPLING.
No. 417,670. Patented Dec. 17, 1889.
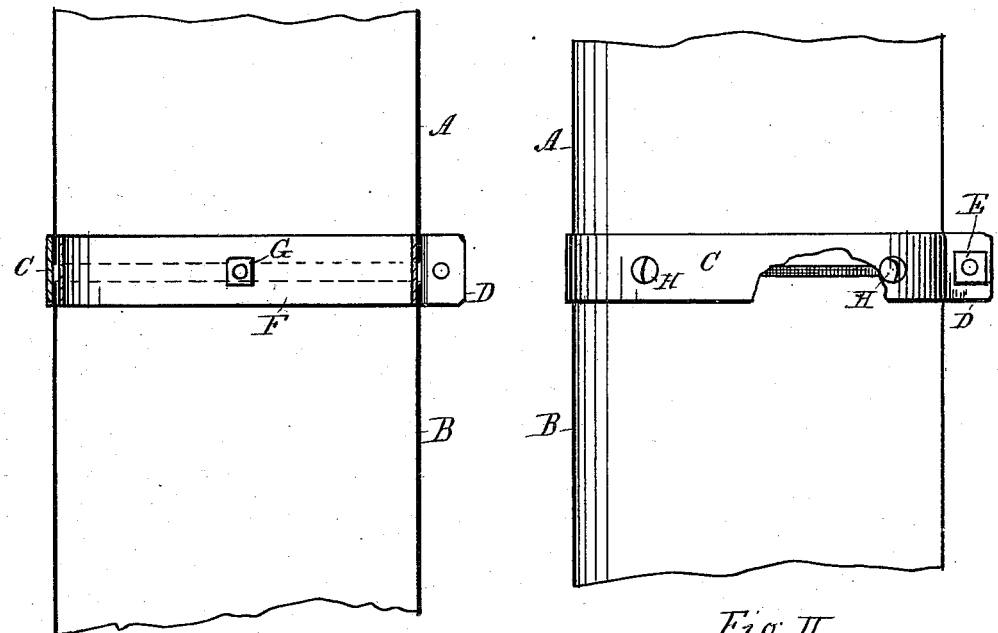
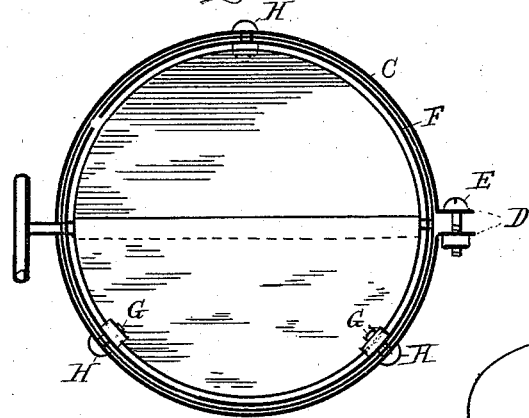
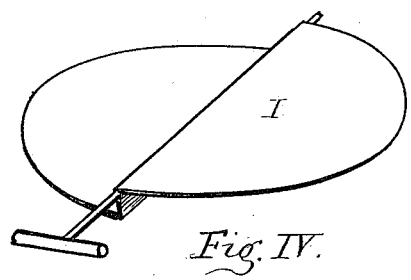
WITNESSES:
R. S. Millar
Robert Kirk
INVENTOR:
J. A. Elliott
By J. Bailey
Attorney.

United States Patent Office.

JUDSON A. ELLIOTT, OF CINCINNATI, OHIO.

STOVE-PIPE COUPLING.

SPECIFICATION forming part of Letters Patent No. 417,670, dated December 17, 1889.

Application filed August 12, 1889. Serial No. 320,438. (No model.)

*To all whom it may concern:*

Be it known that I, JUDSON A. ELLIOTT, of Cincinnati, in the county of Hamilton and State of Ohio, have invented a new and useful Improvement in Stove-Pipe Couplings, which improvement is fully set forth in the following specification and accompanying drawings, in which—

Figure I is a longitudinal sectional view of two sections of stove-pipe connected by my improved coupling; Fig. II, a side elevation showing the application of the external clamping-band; Fig. III, a cross-section through the line $x$, Fig. I; and Fig. IV, a view of the damper.

My invention relates to improvements in stove-pipe couplings; and its object is to provide a simple, practical, and efficient device which may be readily applied or removed and whereby sections of pipe may be quickly and securely connected, so that they cannot become accidentally detached or expose the smallest openings for the escape of smoke or soot.

It is well understood that pipes which are made tapering in form and joined in the ordinary manner by introducing one within the other frequently become loosened and fall, by reason of the alternate expansion and contraction caused by heat and cold and by the vibrations of the building, with the result of positive damage to furniture, added to the risk of destructive fires.

This device is especially applicable to pipe of which the ends of the meeting sections are of uniform size; but it may also be used to advantage in connecting pipe which is made in the ordinary manner. The ends of the sections are embraced by a metallic band having flanged ends which are adjustably compressed by a screw. I also employ an inner band of sheet metal, between which and the outer band the ends of the pipe are firmly confined by a suitable number of screws. This form of coupling furthermore provides an appropriate attachment for a damper, as will be hereinafter set forth.

Referring to the accompanying drawings, A B designate two sections of a stove-pipe coupled by a clamping-band C, provided with flanged ends D and binding-screw E. An inner band F is formed of a strip of sheet metal bent to conform to the interior surfaces of the pipes. A suitable number of small nuts G are attached to the inner band and engage screws H, whereby the adjacent ends of the pipe are securely clasped between the outer and inner bands. The axle of the damper I passes through both the outer and inner bands, and has thereby a better and more durable bearing than otherwise, with the additional advantage of security against the escape of smoke.

It will be noticed that in addition to the practical utility of the device it may be made highly ornamental at a small expense by the use of polished or embossed metal for the outer bands.

What I claim as new is—

1. A coupling for pipe-joints, comprising an outer band having flanged ends and a binding-screw, and an inner re-enforcing band, substantially as herein set forth.

2. In a coupling for stove-pipe joints, the combination of the pipe, clamping-band C, having flanged ends D, the inner band F, the nuts G, and screws H, substantially as specified, and for the purposes set forth.

3. In a coupling for pipe-joints, an outer band having flanged ends and a binding-screw, in combination with the adjacent ends of a pipe and an inner re-enforcing band, substantially as herein set forth.

In testimony that I claim the foregoing I have hereunto set my hand, this 9th day of August, 1889, in the presence of witnesses.

JUDSON A. ELLIOTT.

Witnesses:
WILLIAM CORNELL,
RICHARD KINGSON.